Sept. 6, 1960 J. KATZEN 2,951,421
FRANGIBLE CONNECTOR
Filed Jan. 28, 1958 2 Sheets-Sheet 1

Inventor
JACK KATZEN
By Alfred B. Levine

Sept. 6, 1960

J. KATZEN 2,951,421

FRANGIBLE CONNECTOR

Filed Jan. 28, 1958

Inventor
JACK KATZEN
By Alfred C. Levine

United States Patent Office 2,951,421
Patented Sept. 6, 1960

2,951,421

FRANGIBLE CONNECTOR

Jack Katzen, Philadelphia, Pa., assignor to General Electric Company, a corporation of New York Filed Jan. 28, 1958, Ser. No. 711,686

3 Claims. (Cl. 89—1.7)

The present invention relates to a frangible connector and more particularly to a frangible connector providing a continuous electrical connection between a missile and its launching device.

Presently, continuous electrical connection between a high speed vehicle, such as a missile, or the like, and launching device is usually provided by the use of umbilical connectors. In brief, these umbilical connectors utilize either coacting friction pins, contact pressure fingers, or other such discontinuous devices consisting of various structural and mechanical components operating together to maintain continuous electrical connection until the high speed vehicle is launched.

The present invention consists of a frangible connector providing a continuous path for current flow of any magnitude while substantially eliminating the objections to friction or pressure type connectors. The frangible connector comprises a pair of axially coacting supporting members having one suitably mounted on a missile and the other on a launching device cooperating to separably maintain a plurality of electrical conductors therethrough in a compact manner for launching of the missile. The present device permits the severing of the electrical conductors supported therein, to eliminate any possibility of shorting between severed ends of the plurality of circuits incorporated in the connector, after the launching of the high speed vehicle.

An object of the present invention is the provision of a frangible connector providing continuous electrical connection between a high speed vehicle and the launching device.

Another object is to provide a frangible connector which permits the efficient and speedy severance of electrical circuits between missile and launching device and eliminates the possibility of shorting between missile circuits on the severed end when the connection is broken.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
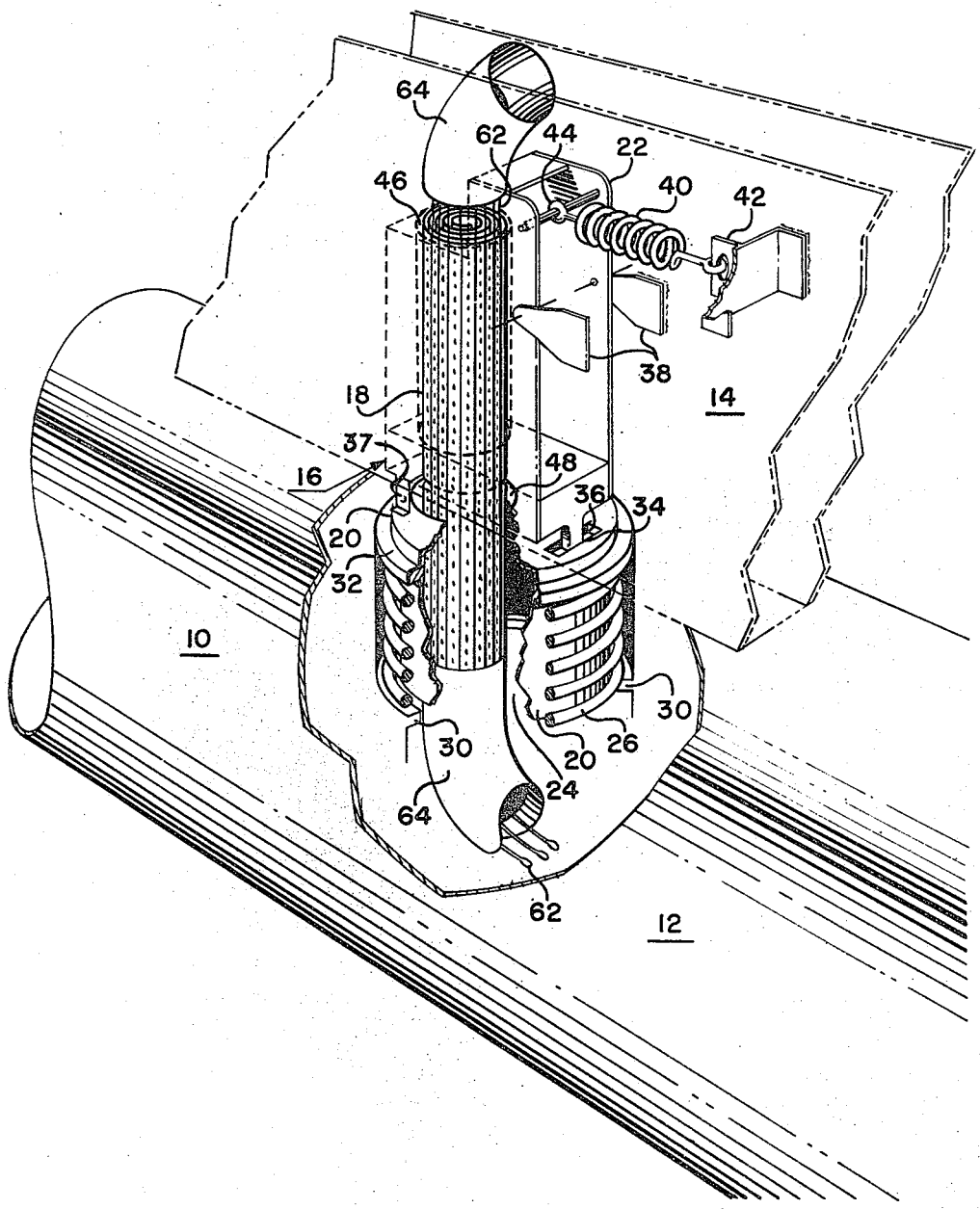
Figure 1 is a perspective view, partly in section, of a preferred embodiment of the invention.

Referring now to the drawings, there is illustrated a preferred embodiment 10 comprising a missile 12 operatively coacting with a launcher 14 electrically coupled to each other by a frangible connector assembly 16 suitably supporting therein a spiraled severable tape 18. The frangible connector assembly, constructed of such material as metal, plastic, or the like, having structural rigidity and capable of withstanding high operational temperatures, comprises a receptacle member 20 and a coacting pivoting support member 22. The receptacle member is resiliently supported within a suitable bore 24 provided on the missible 12, while the support member is pivotally supported on the launcher.

It should be understood, of course, that the frangible connector assembly 16 may be of any suitable structural configuration, such as square external design, or round, as shown, so as to facilitate the production, maintenance, and the application thereof to the desired missile. Suitable resilient means, such as a coil spring 26, is provided coaxial with the receptacle member to permit the support member to pivot away from the missile and to then allow the receptacle member to return to its original flush position with respect to the missile surface. Suitable flange means 28 and 30 are provided on the missile structure, coaxial with the bore 24 to form limiting means to maintain the coil spring therebetween to bias a flange 32, integral with the receptacle member against flange 28.

The receptacle assembly 20 is formed with a transverse slot 34 operatively engaging a prong member 36 integrally formed on the supporting member 22. In this manner, the prong member 36 is positioned within the transverse slot 34 to form a temporary but positive coupling between the receptacle member 20 and the support member 22. In addition, the support member is pivotly mounted on the launcher 14 by any suitable means such as a bracket assembly 38, secured, such as by welding, or the like, to the launcher. If desired, the support member and the receptacle member may be further interconnected by a suitable temporary locking device, such as a shear pin locking means 37.

The support member 22 is biased about the pivotal axis of the bracket assembly 38 by spring member 40 pivotally attached to the launcher at a point 42, and to the support member at a point 44. In this manner, it can be seen that the spring member 40 is biasing the support member about the axis of the bracket assembly and will pivot the support member about this axis away from the receptacle member as soon as the tape 18 is severed. Hence, the prong member 36 will be removed from the path of the missile and available for use at other missile launchings.

Figure 3:
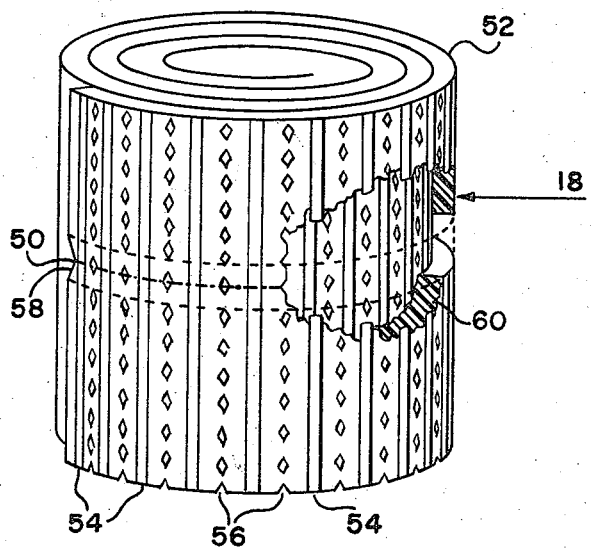
Figure 3 is a plane view, greatly exaggerated for purposes of illustration, of the severable tape coupling the connecting cables between the missile and the launcher.

An aperture 46 is provided through the support member 22, in axial alignment with a coacting aperture 48, provided in the receptacle assembly 20, whenever the prong member 36 is in operative coaction with the slot means 34. The tape is provided with a breaking line 50 formed by potting the tape up to a plane substantially coinciding with the contacting faces of the receptacle assembly 20 and the support member 22. As seen in Figure 3, the tape 18 is formed from a paper or plastic member 52 provided with parallel conducting strips 54, which may be relatively small or great in number, suitably printed on only one or both sides of the tape. In between the conducting strips, the tape is provided with parallel spaced perforations, such as diamond shape perforations 56, or the like, which serve to facilitate the potting of the rolled tape by allowing the potting material to flow therethrough to form a unitary structure. A notch 58 is provided at both edges of the tape 18 to assist in providing the break line 50 at the plane coinciding with the contacting face of the assembly 20 and the member 22.

The paper or plastic member 52 is rolled or coiled to form the desired shape of the tape 18, and is then provided through each end thereof with a potting material 60, such as resin, or the like, substantially up to the break line 50. In this manner, the tape 18 will be potted so that the plane at the breaking line will be free of any potting material to facilitate the rupture or tearing of the tape upon the launching of the missile. The ends of the conducting strips 54 are secured to conductors 62 integrally provided in connecting cables 64 to obtain a continuous electrical connection between the missile and the launching device. If desired the connecting cable within the missile may be wired to a terminal strip, not shown.

Figure 2:
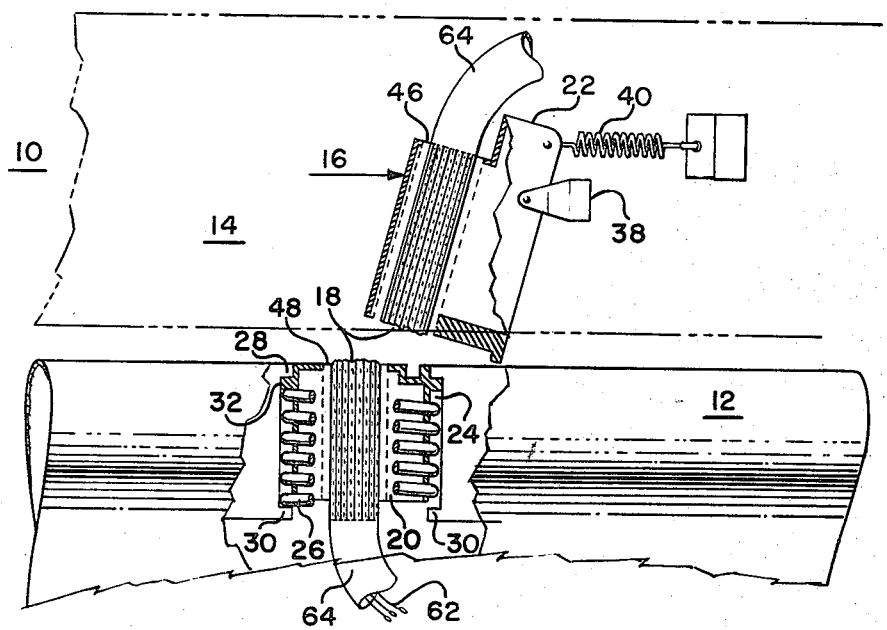
Figure 2 is a perspective view, partly in section, of the preferred embodiment of Figure 1 illustrating the rupture of the spiraled conducting tape electrically connecting the missile with the lauching device.

In the operation of the preferred embodiment 10, as the missile 12 is fired and moves forward with respect to the launcher 14, as indicated in Figure 2, the transverse slot 34, on the receptacle member 20 which is resiliently supported in the missile by the spring 24, and the prong member 36 commence to disengage. At this time, the shear pin 37 will break and the tape will be placed in tension. The tension spring 40 will actuate the support member 22 about the pivotal axis of the bracket assembly to remove the member from the path of the missile. As the missile 12 moves forward, the coiled tape 18 will completely part along the breaking line 50 so that the tape is severed, as shown in Figure 2. After severance of the tape, the spring 26 will bias the receptacle member to its initial position with respect to the surface of the missile.

In this manner, the frangible connector assembly 16 provides a continuous electrical connection between the missile 12 and the launcher 14 up to the final moment before departure of the missile from the launcher. The use of the tape 18 permits a clean severance of the conducting strips since there is no wire which can possibly be drawn when the connection is broken to create protuberances which could short each other to the detriment of the missile.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A frangible connector for continuous electrical coupling between a high speed missile and a launching device, comprising a receptacle member resiliently mounted on the missile, a support member pivotally mounted on the launching device in juxtaposed relationship to said receptacle member, a first aperture in said receptacle member, a second aperture in said support member coaxial with said first aperture, a severable tape mounted in said first and second coaxial aperture with the respective end thereof coupled to terminal means within the missile and within the launching device, prong means integral with said support member, transverse slot means integral with said receptacle member and freely supporting therein said prong member, whereby upon launching of the missile said prong means operatively coact with said transverse slot to pivot said support member with respect to the launching device to sever the tape.

2. A frangible connector to provide a continuous electrical connection between a missile and a launching device, comprising a receptacle member resiliently mounted within the missile, a support member pivotally coacting with the launching device, said receptacle member having a transverse slot integral therewith, a prong member integrally formed on said support member and operatively engaging said transverse slot to provide a separable positive coupling therebetween, a bracket assembly integral with the launching device and pivotally supporting thereon said support member, a spring member attached to the launching device and biasing said support member about the axis of said bracket assembly for predetermined pivotal movement away from said receptacle member, aperture means provided in said receptacle member and in said support member in a coaxial relationship, a severable rolled tape supported within said coaxial aperture means and having a breaking line in a plane substantially coinciding with the contacting faces of said receptacle member and said support member, so that upon actuation of the missile the coaction of the prong member within said transverse slot will pivot said support member about said bracket assembly to sever said tape substantially on said breaking line.

3. The invention as defined in claim 2 but further characterized by said severable rolled tape, having a plurality of parallel conducting strips printed on the surface thereof, a plurality of parallel perforations alternately spaced with respect to said conducting strips, a notch provided at the edges of said tape coinciding with said breaking line, potting means within said rolled tape up to said breaking line to facilitate the rupture thereof upon launching of the missile, the respective ends of said conducting strips suitably coupled to terminal strips on the launching device and on the missile to permit a continuous electrical connection therebetween.

References Cited in the file of this patent

UNITED STATES PATENTS

| | | |
|---|---|---|
| 2,460,929 | Goff | Feb. 8, 1949 |
| 2,495,834 | Katzman et al. | Jan. 31, 1950 |
| 2,632,788 | Ustin | Mar. 24, 1953 |
| 2,712,270 | Green | July 5, 1955 |
| 2,749,382 | Lockard | June 5, 1956 |
| 2,752,824 | Mraz | July 3, 1956 |
| 2,824,496 | Kuller et al. | Feb. 25, 1958 |